Patented Sept. 9, 1952

2,610,188

UNITED STATES PATENT OFFICE 2,610,188

2-AMINO-4-DIALKYLAMINOPROPOXY-PYRIMIDINES

William Oroshnik, Plainfield, N. J., assignor to Ortho Pharmaceutical Corporation, a corporation of New Jersey No Drawing. Application November 7, 1950, Serial No. 194,563

4 Claims. (Cl. 260—256.4)

This invention relates to certain therapeutically effective organic compounds which are derivatives of isocytosine, 2-amino-4-hydroxypyrimidine; and to their use as therapeutic agents having the ability to lower blood pressure. More specifically this invention relates to 2-amino-4-dialkylaminopropoxypyrimidines in which each alkyl is a methyl or ethyl radical. The said isocytosine derivatives having the ability to lower blood pressure may be represented by the following graphic formula:

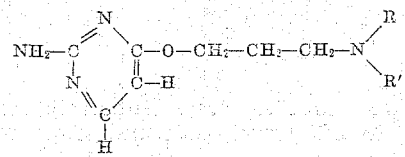

in which R and R' are each an aliphatic radical which may be methyl or ethyl.

A number of derivatives of isocytosine have been prepared and studied for various pharmaceutical and medicinal uses, but it is believed that the particular derivatives of isocytosine with which this invention is concerned are new substances. It is also believed the ability of these substances to effect a lowering of blood pressure has not been known heretofore.

The derivatives of isocytosine to which this invention is directed may be used as such to produce a lowering of blood pressure. They also may be used in the form of salts of the isocytosine derivatives with organic or inorganic acids and since the said derivatives are basic in character, they may be readily converted into salts having substantially more solubility in water than the free bases. Salts of organic dibasic acids such as the succinate, maleate, tartrate, lactate, fumarate and the like are preferred, but salts of simple low-molecular weight aliphatic organic acids as well as salts of the free bases with inorganic acids, may be readily prepared from the free bases and are highly effective therapeutically.

The new and novel derivatives of isocytosine to which the present invention is directed have considerable therapeutic value which renders their use as pharmaceutical products highly advantageous, either alone or in combination with known pharmaceutical products. The ability of these novel substances to lower blood pressure has been shown by a number of experiments, the results of which are given in the table below, in which a salt of the isocytosine derivatives was injected into anesthetized dogs. A continuous record of blood pressure before and after injection with the blood pressure lowering compounds was made on a kymograph. Additional derivatives of isocytosine which are homologues of 2-amino-4-dialkylaminopropoxypyrimidines were also tested in the same way to determine their effect on blood pressure. Aqueous solutions of sesquisuccinates of the isocytosine derivatives were injected intravenously into dogs which had been anesthetized by intraperitoneal injection of 300 milligrams of sodium barbital for each kilogram of dog weight. The volume of each injection of sesquisuccinate salt of isocytosine derivative was 0.5 cc. per kilogram of dog weight and each injection was made over a period of 30 seconds.

The sesquisuccinates of the following compounds were tested for their pharmacological property of lowering the blood pressure of dogs:

Compound I—2-amino-4-dimethylaminopropoxypyrimidine
Compound II—2-amino-4-diethylaminopropoxypyrimidine
Compound III—2-amino-4-dimethylaminoethoxypyrimidine
Compound IV—2-amino-4-diethylaminoethoxypyrimidine
Compound V—2-amino-6-methyl-4-diethylaminoethoxypyrimidine Each compound as its sesquisuccinate was administered to three dogs at dosage levels of 2, 4, 8, and 16 milligrams per kilogram of dog weight and 6–10 injections were made at each dosage level. Per cent decrease in blood pressure as given in the table is the average per cent decrease in blood pressure resulting from injections at a particular dosage level. Duration of decrease in blood pressure as given in the table is the average time required for blood pressure to return to substantially preinjection level after injections at a particular dosage level.

| Compound | 2 Milligrams per Kilogram of dog weight | | 4 Milligrams per Kilogram of dog weight | | 8 Milligrams per Kilogram of dog weight | | 16 Milligrams per Kilogram of dog weight | |
|---|---|---|---|---|---|---|---|---|
| | Percent decrease in blood pressure | Duration of decrease in blood pressure | Percent decrease in blood pressure | Duration of decrease in blood pressure | Percent decrease in blood pressure | Duration of decrease in blood pressure | Percent decrease in blood pressure | Duration of decrease in blood pressure |
| 1 | 0 | 0 | 2 | 20 | 9 | 105 | 26 | 479 |
| 2 | 10 | 97 | 18 | 175 | 31 | 481 | 55 | 1031 |
| 3 | 0 | 0 | 0.65 | 4 | 7 | 44 | 18 | 165 |
| 4 | 6 | 23 | 12 | 42 | 24 | 93 | 34 | 194 |
| 5 | 1 | 9 | 4 | 12 | 7 | 51 | 13 | 103 |

Compounds I and II are markedly superior to compounds III, IV, and V, in their ability to effect a lowering of blood pressure, and are particularly superior in their ability to maintain blood pressure at the lower level for an extended period of time. At the 16 milligrams per kilogram of body weight dosage level, compounds I and II are markedly superior to compounds III, IV, and V in their ability to maintain the blood pressure at a lower level for an extended period of time.

Compounds I and II have been shown to be nontoxic and to have no harmful side effects upon administration to dogs at dosage levels many times greater than 16 milligrams per kilogram of dog weight.

The sesquisuccinate salts of the derivatives of isocytosine to which this invention is directed have been found to be effective in lowering blood pressure when administered orally. Oral administration of 500 milligrams of the sesquisuccinate to a dog weighing six kilograms resulted in a prolonged and sustained fall in blood pressure which had not returned to preinjection level in four hours.

Derivatives of isocytosine, such as 2-amino-4-dialkylaminopropoxypyrimidines, may be prepared by reacting 2-amino-4-chloropyrimidine with the sodium salt of a dialkylaminopropanol. The following is an example of the preparation of 2-amino-4-diethylaminopropoxypyrimidine in which the parts are given by weight. 25 parts of sodium metal were slowly added to 150 parts of diethylaminopropanol dissolved in 500 parts of xylene. 1200 parts of benzene were then added to the resulting sodium salt of diethylaminopropanol. 129 parts of 2-amino-4-chloropyrimidine were added to the above solution with stirring and during the addition the solution was cooled sufficiently to maintain the temperature at 80° C. After the addition had been completed, the reaction mixture was refluxed for one hour and cooled. 100 parts of water containing 10 parts of dissolved sodium hydroxide were added with stirring to the cooled reaction mixture. At this point two layers were formed and the organic layer was decanted, dried over anhydrous potassium carbonate, and the solvents, benzene and xylene, were removed by distillation. The residue in the distillation flask was distilled at reduced pressure. Distilled material amounting to 168 parts and having a melting point of 50-52° C. was obtained.

The 2 - amino - 4 - diethylaminopropoxypyrimidine prepared as above was converted into its water soluble succinate salt. 11.3 grams of the free amine and 8.9 grams of succinic acid were dissolved in 30 cc. of alcohol. Upon addition of 60 cc. of acetone to this solution, a white crystalline material was obtained which was purified by recrystallization from a mixture of alcohol and acetone; it had a melting point of 103-104° C. The crystalline salt had the following formula:

$$(C_{11}H_{20}N_4O)_2(C_4H_6O_4)_3$$

What is claimed is:

1. A compound having the structural formula

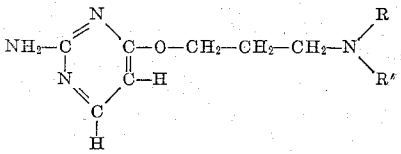

in which R and R' each represent an alkyl radical selected from the group consisting of methyl and ethyl radicals.

2. A compound according to claim 1 in which R and R' are each a methyl radical.

3. A compound according to claim 1 in which R and R' are each an ethyl radical.

4. A compound according to claim 1 in which R is a methyl radical and R' is an ethyl radical.

WILLIAM OROSHNIK.

REFERENCES CITED

The following references are of record in the file of this patent:

Sutherland et al.: J. Org. Chem., 14, 235-238 (1949).